(12) United States Patent
Delgado-Nanez et al.

(10) Patent No.: US 12,706,562 B2
(45) Date of Patent: Aug. 11, 2026

(54) MODULE RAIL ASSEMBLY

(71) Applicant: Nextpower LLC, Fremont, CA (US)

(72) Inventors: Ricardo Delgado-Nanez, San Jose, CA (US); Ryan Patel, Pleasanton, CA (US); Craig Bradley Edward Wildman, Kensington, CA (US); Madeleine Davis Kho, Oakland, CA (US)

(73) Assignee: NEXTPOWER LLC, Fremont, CA (US)

( * ) Notice: Subject to any disclaimer, the term of this patent is extended or adjusted under 35 U.S.C. 154(b) by 0 days.

(21) Appl. No.: 18/654,375

(22) Filed: May 3, 2024

(65) Prior Publication Data

US 2024/0372506 A1 Nov. 7, 2024

Related U.S. Application Data

(60) Provisional application No. 63/464,390, filed on May 5, 2023.

(51) Int. Cl.
*H02S 20/32* (2014.01)
*F16B 5/06* (2006.01)

(52) U.S. Cl.
CPC ............ *H02S 20/32* (2014.12); *F16B 5/0685* (2013.01)

(58) Field of Classification Search
None
See application file for complete search history.

(56) References Cited

U.S. PATENT DOCUMENTS

| | | | | |
|---|---|---|---|---|
| 11,984,842 | B2 * | 5/2024 | Mouniandy | H02S 30/10 |
| 2011/0265860 | A1 | 11/2011 | Ciasulli et al. | |
| 2015/0200621 | A1 | 7/2015 | Reed et al. | |
| 2020/0076360 | A1 * | 3/2020 | Watson | F24S 25/70 |
| 2020/0373882 | A1 | 11/2020 | Watson et al. | |
| 2022/0149772 | A1 * | 5/2022 | Watson | H02S 30/20 |
| 2022/0271706 | A1 * | 8/2022 | Creasy | H02S 30/10 |
| 2022/0294386 | A1 * | 9/2022 | Creasy | B21D 28/02 |
| 2023/0009592 | A1 * | 1/2023 | Sable | H02S 30/00 |
| 2023/0188086 | A1 * | 6/2023 | Garza | H02S 30/10 136/244 |
| 2023/0246589 | A1 * | 8/2023 | Morankar | H02S 30/00 248/475.1 |
| 2023/0261610 | A1 * | 8/2023 | Watson | H02S 30/20 136/245 |
| 2024/0128920 | A1 * | 4/2024 | de Fresart | H02S 20/23 |
| 2024/0396490 | A1 * | 11/2024 | Sable | F24S 30/425 |

OTHER PUBLICATIONS

International Searching Authority "International Search Report and Written Opinion" , From Application No. PCT/US2024/027648, Mailed Aug. 7, 2024, pp. 13.

* cited by examiner

*Primary Examiner* — Steven M Marsh
(74) *Attorney, Agent, or Firm* — Fredrikson & Byron, P.A.

(57) ABSTRACT

A solar module mounting bracket including a rail, having a box section configuration to support a solar module and a pair of arms each having a first end portion movably coupled to the rail. The pair of arms are movable relative to the rail between a first parallel configuration, and a second substantially configuration, in which the pair of arms define an opening configured to receive a torque tube. The arms each have a hole formed in a second end portion opposite the first end portion to receive a fastener to secure the rail to the torque tube.

20 Claims, 8 Drawing Sheets

MODULE RAIL ASSEMBLY

RELATED APPLICATIONS

This application claims the benefit of U.S. Provisional Patent Application No. 63/464,390, filed May 5, 2023, the entire contents of which are incorporated herein by reference.

FIELD

This disclosure relates generally to mounting brackets. More specifically, the disclosure relates to mounting brackets for coupling solar modules to a framework for solar trackers which can be installed with minimal tools, fewer steps, and require less material in their construction.

BACKGROUND

Solar mounting systems are provided to support and couple an array of one or more photovoltaic ("PV") modules to a framework, such as, for example, a plurality of parallel-oriented, rotatable torque tubes. The solar mounting systems are designed to maintain the PV modules in a fixed position relative to the torque tube while the torque tube is rotating during solar tracking.

Solar mounting systems can add significant cost to a solar power system for at least two reasons. First, the components themselves are expensive to manufacture, ship, and install. Second, installation and operation can be expensive because they require time and skilled operators to conduct quality control measures in the field. Therefore, there is a need for PV mounting systems that are easier and cheaper to package, ship, and install.

SUMMARY

One aspect of the disclosure is directed to a solar module mounting bracket. The solar module mounting bracket includes a rail, having a box section configuration, and configured to support a solar module thereon; a pair of arms each having a first end portion movably coupled to the rail, where the pair of arms are movable relative to the rail between a first substantially parallel configuration, and a second substantially perpendicular configuration to define an opening configured to receive a torque tube, where the arms each have a hole formed in a second end portion opposite the first end portion and configured to receive a fastener to secure the rail to the torque tube.

Implementations of this aspect of the disclosure may include one or more of the following features. The solar module mounting bracket where the opening defined by the arms is a square or rectangular opening. The opening defined by the arms is a D-shaped opening. The rail includes a plurality of holes formed therein configured to receive electrical cables. The solar module mounting bracket further including at least one clip configured to secure a solar module to the rail. Clip further includes a top surface with at least one opening formed therein, the opening configured to receive a fastener to secure a solar module to the clip. The clip further includes at least one side surface, the side surface having at least one hole formed therein, the hole configured to receive a fastener to secure the clip to the rail. Each pair of clips is secured to the rail with a plurality of fasteners, and each pair of clips is arranged on the rail to receive a solar module in a portrait configuration, where in a portrait configuration a long side of the solar module is parallel to the rail. The two pairs of clips are secured to the rail to receive two solar modules in portrait. Each clip includes at two openings formed in a top surface, each opening having an oblong shape, where the two openings are configured to receive two solar modules parallel to one another.

A further aspect of the disclosure is directed to a solar tracker including a plurality of piers; a bearing supported by one of the plurality of piers, a drive device supported by one of the plurality of piers. The solar tracker also includes a torque tube operably connected to the drive device and supported by the plurality of piers; and a solar module mounting bracket, where the solar module mounting bracket includes a rail, having a box section configuration, and a pair of arms each having a first end portion movably coupled to the rail, where the pair of arms are movable relative to the rail between a first substantially parallel configuration and a second substantially perpendicular configuration to define an opening configured to receive the torque tube, where the arms each have a hole formed in a second end portion opposite the first end portion and configured to receive a fastener to secure the rail to the torque tube.

Implementations of this aspect of the disclosure may include one or more of the following features. The solar tracker where the torque tube is a square or rectangular torque tube and the opening defined by the arms is a square or rectangular opening. The torque tube is a d-shaped torque tube and the opening defined by the arms is a d-shaped opening. The rail includes a plurality of holes formed therein configured to receive electrical cables. The solar module mounting includes at least one clip configured to secure a solar module to the rail. Clip further includes a top surface with at least one opening formed therein, the opening configured to receive a fastener to secure a solar module to the clip. The clip further includes at least one side surface, the side surface having at least one hole formed therein, the hole configured to receive a fastener to secure the clip to the rail. Each pair of clips is secured to the rail with a plurality of fasteners, and each pair of clips is arranged on the rail to receive a solar module in a portrait configuration, where in a portrait configuration a long side of the solar module is perpendicular to a longitudinal axis of the torque tube. The two pairs of clips are secured to the rail to receive two solar modules in portrait. Each clip includes at two openings formed in a top surface, each opening having an oblong shape, where the two openings are configured to receive two solar modules parallel to one another.

BRIEF DESCRIPTION OF THE DRAWINGS

Embodiments of the present disclosure are described herein with reference to the accompanying drawings, wherein.

DETAILED DESCRIPTION

Figure 1:
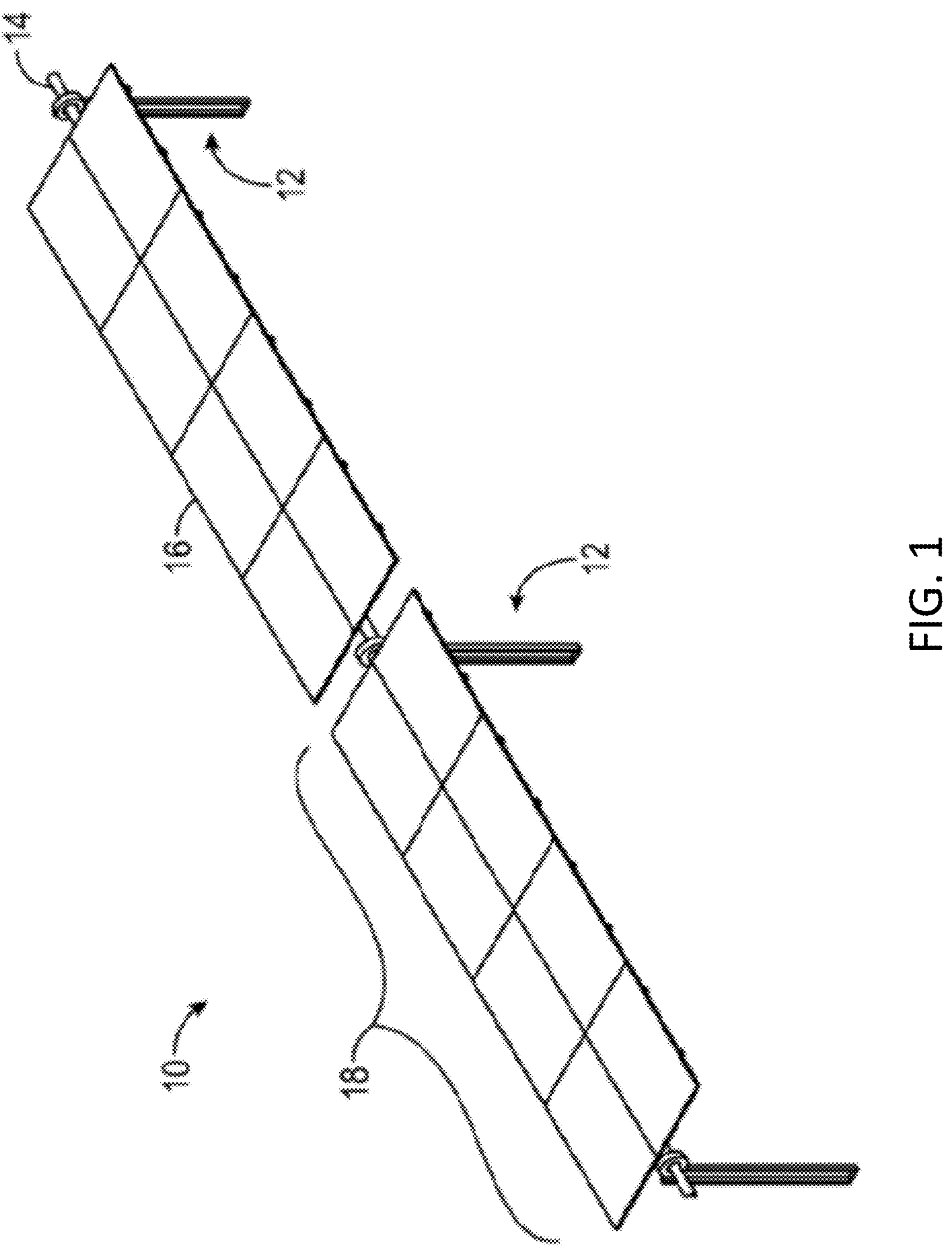
FIG. 1 is a top view of a solar power system in accordance with an exemplary embodiment of the present disclosure.

Embodiments of the disclosed solar module mounting bracket assemblies and methods of installing the same are described in detail with reference to the drawings, in which like reference numerals designate identical or corresponding elements in each of the several views. As described herein, the term "solar module" refers to any suitable solar panel or array of solar panels that convert energy from the sun into usable energy.

This disclosure, in accordance with various example embodiments thereof, relates to a mounting bracket assembly for coupling one or more solar modules (e.g., PV modules) to a framework. The mounting bracket assembly has a rail for affixing the one or more PV modules thereon, and a pair of braces pivotably coupled to the rail. The braces are movable relative to the rail from a collapsed configuration to an expanded configuration. The collapsed configuration reduces the overall footprint of the mounting bracket assembly, thereby reducing packaging and shipping costs. In the expanded configuration, the braces grasp the framework (e.g., a torque tube) to fix the mounting bracket assembly and, in turn, the one or more PV modules, to the framework. These and further details of the mounting bracket assemblies will be described below.

With reference to FIG. 1, a solar tracker 10 is illustrated. Piers 12 are spanned by a torque tube 14. A plurality of solar modules 16 are supported by and allowed to rotate with the torque tube 14. A distance between two piers 12, where plurality of solar modules 16 are supported by the torque tube 14 define bay 18. In FIG. 1, the solar modules 16 are arranged in a "two-in landscape" arrangement where the longer side of the solar module 16 is arranged parallel to the longitudinal axis of the toque tube 14. However, the solar modules 16 may be arranged "two-in portrait" where the shorter side is parallel with the longitudinal axis of the torque tube 14 or even just "one-in portrait" without departing from the scope of the disclosure. Typically, each solar tracker 10 will be formed of a plurality of bays 18, with each bay 18 being between 50 and 100 feet in length. The torque tube 14 is connected to a motor or drive device not shown, which is mechanically connected to the torque tube 14 to rotate the torque tube 14 and therewith the solar modules 16 such that they follow the path of the sun. While not illustrated in FIG. 1, a plurality of solar trackers 10 are typically arranged in a parallel orientation with one another as part of a grid tied solar power plant outputting electrical energy for use by customers of the electrical grid.

As will be appreciated the solar modules 16 must be supported on the torque tube 14. This is typically achieved by a bracket system (not shown in FIG. 1) that is attached to the torque tube 14 substantially perpendicular to the longitudinal axis of the toque tube 14. The torque tube 14 is rotatable about its longitudinal axis to adjust an angular orientation of the solar modules 16 relative to the sun, while supporting the solar modules 16 on the bracket system.

The bracket system can take many forms including two pieces of hat shaped steel, which are arranged to sandwich the solar modules 16, and are configured to connect to a short rail which is bolted to the torque tube. The details of another mounting bracket assembly can be seen in commonly assigned U.S. Pat. No. 10,797,635 entitled SOLAR MODULE MOUNTING BRACKET ASSEMBLIES filed Aug. 29, 2018, the entire contents of which are incorporated herein by reference. Though the '635 Patent describes mounting brackets which solve certain problems of prior designs, improvements are nonetheless always desirable.

Figure 2A:
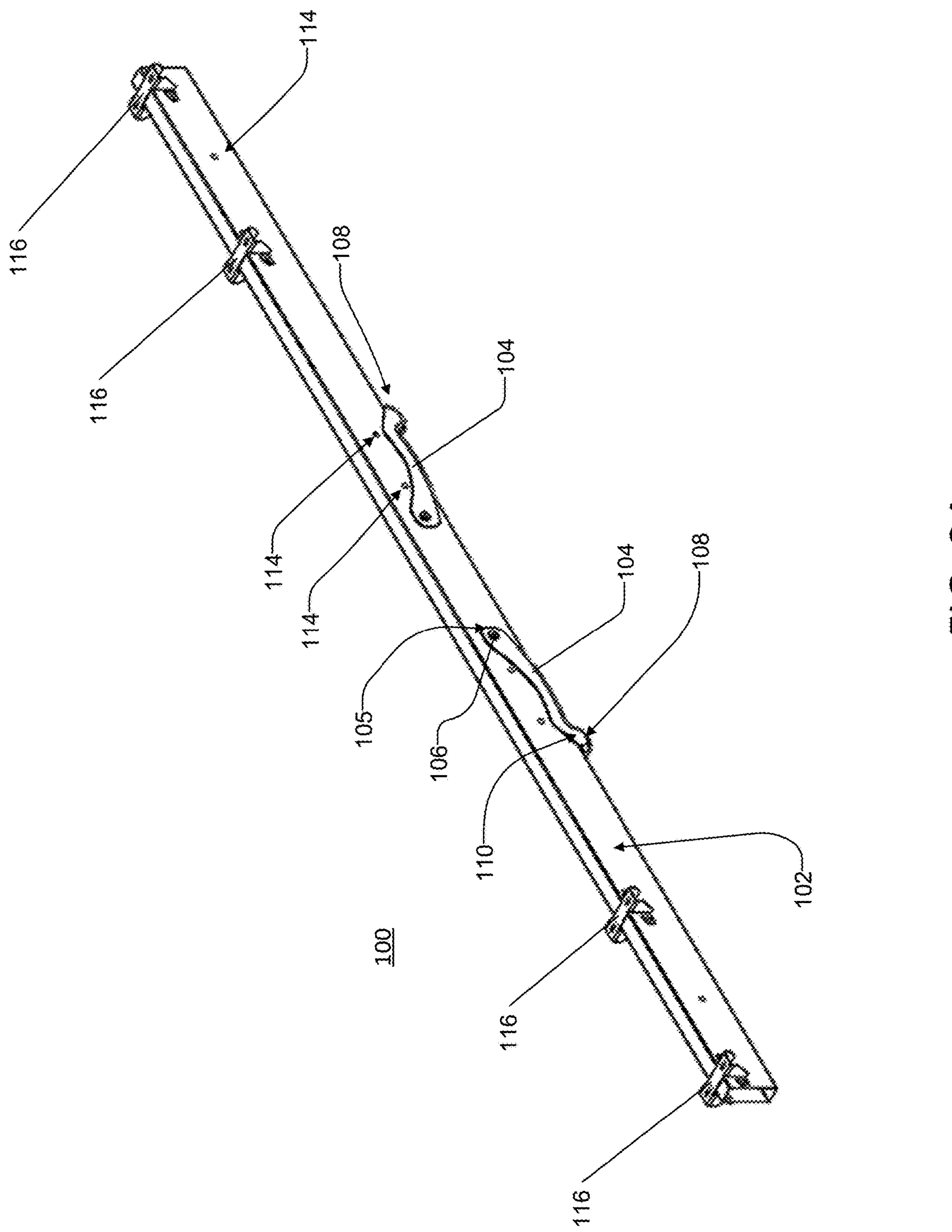
FIG. 2A is a top perspective view of a solar module mounting bracket showing arms in a first position, in accordance with aspects of the disclosure.
Figure 2B:
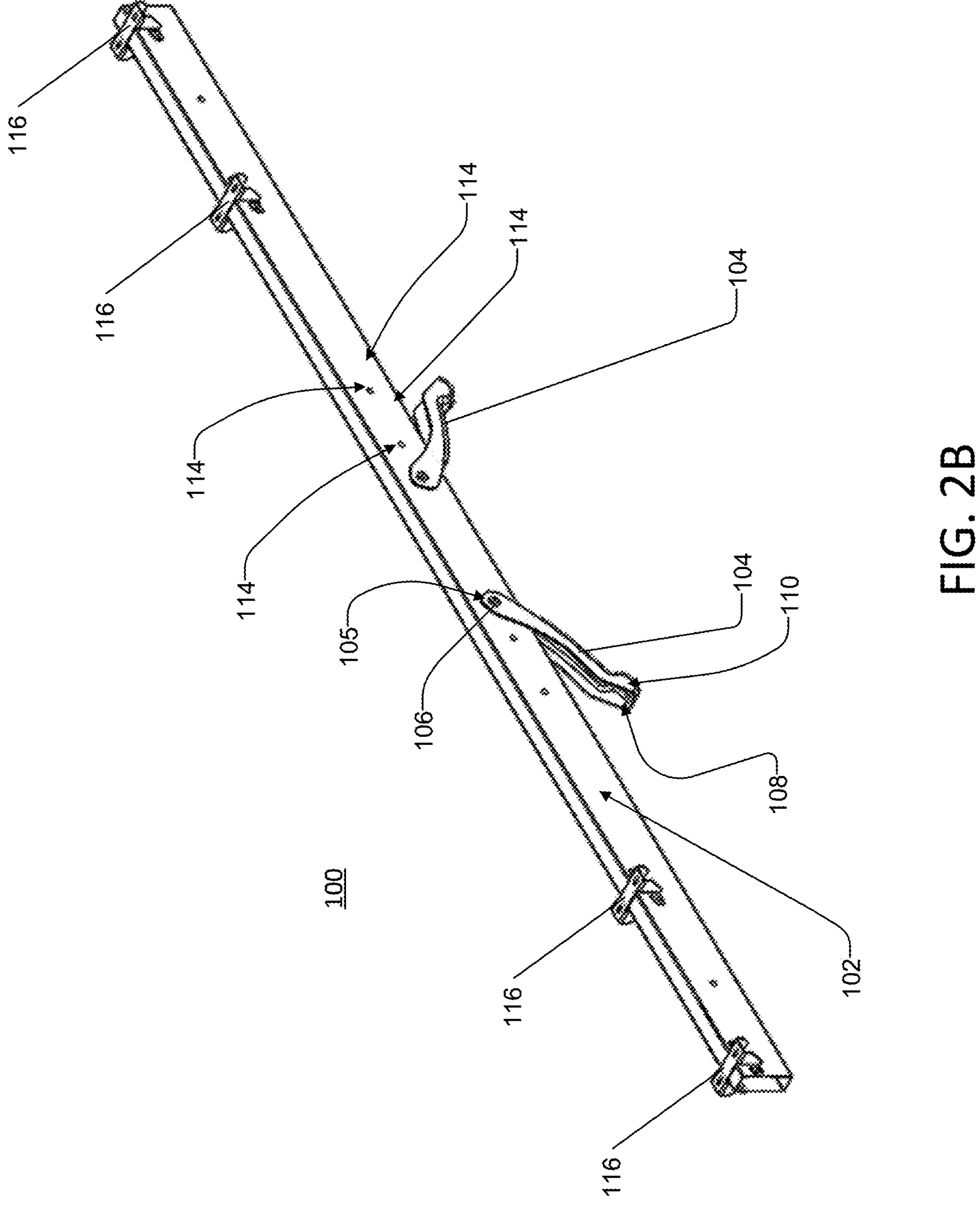
FIG. 2B is a top perspective view of the solar module mounting bracket as in FIG. 2A, showing arms positioned between the first position and a second position, in accordance with aspects of the disclosure.
Figure 2C:
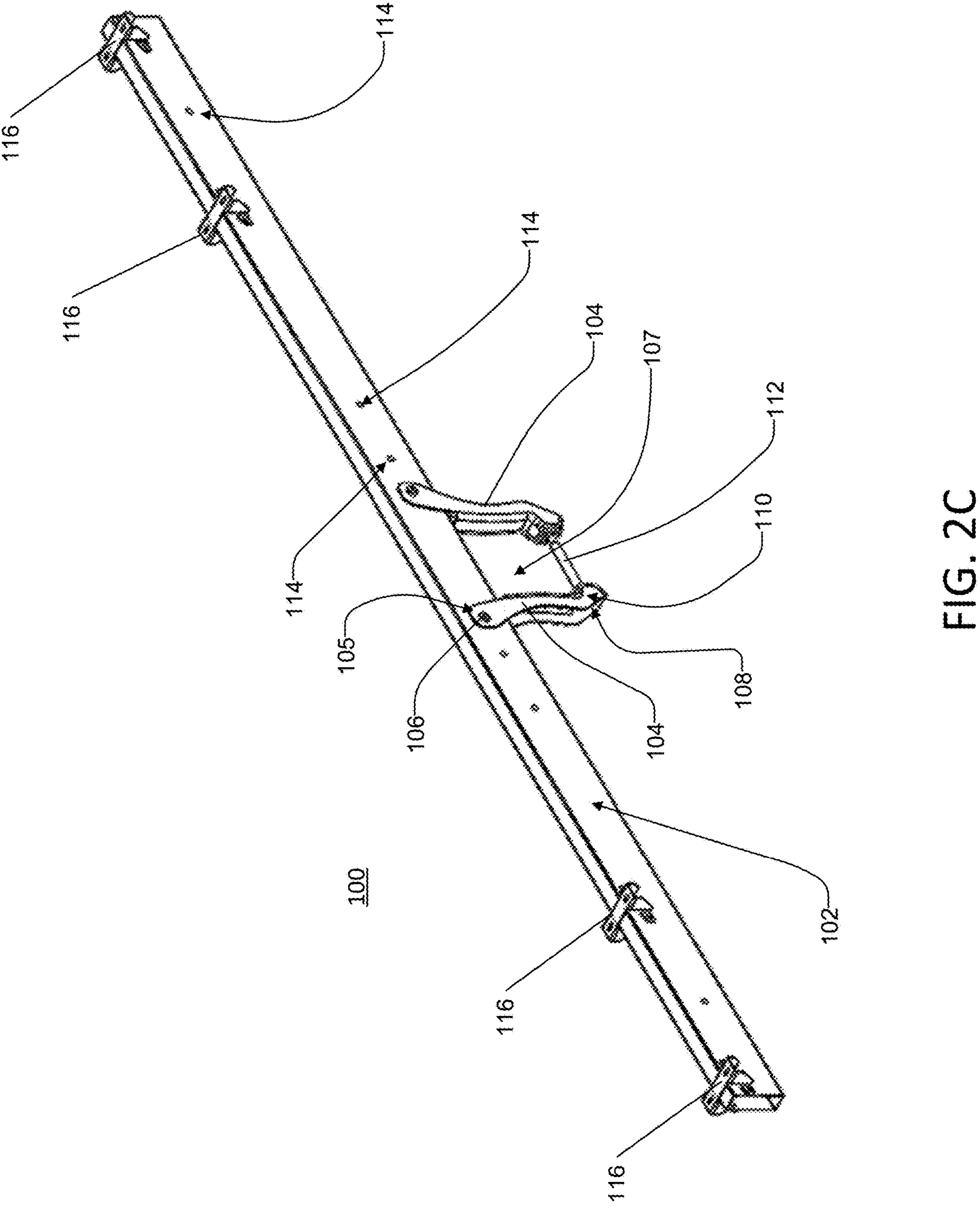
FIG. 2C is a top perspective view of the solar module mounting bracket as in FIG. 2A, showing arms in the second position, in accordance with aspects of the disclosure.

FIGS. 2A to 2C depict a mounting bracket 100 in accordance with the disclosure. FIG. 2A illustrates the solar module mounting bracket 100 showing two arms 104 in a first position, FIG. 2B illustrates the solar module mounting bracket 100 showing the two arms 104 positioned between the first position and a second position, and FIG. 2C illustrates the solar module mounting bracket 100 showing the two arms 104 in the second position.

As shown in FIGS. 2A to 2C, the mounting bracket 100 is comprised of a rail 102 having a box section. A box section provides several benefits over other cross-sectional forms the rail could take. As compared to, for example, a C-channel, or an I-beam, a box section exhibits excellent properties for this application. An I-beam may tend to allow for twisting along the axis of the rail, while a C-channel, to achieve the same resistance to bending will require an overall greater wall thickness as compared to a box section. Thus in accordance with one aspect of the disclosure, a rail 102 formed of a box section is employed. The box section has a wall thickness of between 1.2 and 2.5 mm, which in some instances is thinner than the wall thickness of a C-channel or an I-beam exhibiting similar resistance to bend and twist. In addition to reducing the total amount of material used on the mounting bracket 100 and thus the solar tracker 10, the reduction in the material and particularly the weight of the material and components of the solar tracker 10 may in some instances enable a reduction in the size of torque tube 14 needed to support the solar modules 16, and the size of the motor drive unit used to rotate the solar tracker 10 as it repositions the solar modules to follow the sun across the sky.

Connected to the rail 102 are two arms 104. The arms 104 are connected to the rail 102 via a fastener 106 such as a bolt, rivet, swage fitting, bobtail or others placed through an opening formed in a proximal end 105 of the arm 104. The arms 104 can be rotated about the fastener 106 from a first position, as shown in FIG. 2A, where they are substantially parallel to the longitudinal axis of the rail 102 to an intermediate position between the first position and a second position, where the arms 104 are extended away from the rail 102 at an angle of about 10 degrees to about 85 degrees, as shown in FIG. 2B, to a second position, substantially perpendicular to the rail 102, as shown in FIG. 2C. As will be appreciated, the arms 104 may be attached to the rail 102 during manufacture and by rotating the arms 104 to the first position, a number of mounting brackets 100 may be flat packed together, without the arms 104 taking up much space in the packing allowing for large numbers of the mounting brackets 100 to conveniently packed and shipped to an installation location.

Upon arrival of the installation location (e.g., at a solar power plant location) the arms 104 can be rotated substantially perpendicular to the longitudinal axis of the rail 102, as depicted in FIG. 2C. In the perpendicular or second position, the arms 104 define an opening 107. The opening 107 substantially conforms to the shape (cross-section) of a torque tube 14 of the solar tracker 10. Each arm 104 includes a hole 108 formed in a distal end 110 of the arm 104. The hole 108 in each arm is aligned with the hole 108 in the opposite arm 104, and a fastener 112, such as a bolt, rivet, swage fitting, bobtail or others may be placed through both holes 108. In some instances, no separate fastener is employed, but rather a tool is employed to force the arms 104 to a point where a locking mechanism (e.g., mating embossed features on arms 104) can be engaged securing the mounting bracket 100 to the torque tube 14. With the mounting bracket 100 placed such that a torque tube 14 is in the opening 107 between the arms 104, tightening of the fastener 112 secures the mounting bracket 102 to the torque tube 14. In contrast, with some prior designs, the mounting of bracket 100 is much faster than prior designs as the number of fasteners is reduced and in some instances the clips 116 (described in greater detail below) can be pre-installed at the factory, so that only one fastener 112 need be acted on to secure the mounting bracket 100 to the torque tube 14 ready for attachment of the solar modules. Further, in contrast with some mounting brackets the mounting bracket 100 can be secured to the torque tube by a single individual as there is just one fastener 112 that needs to be tightened while the mounting bracket 100 is held in place on the torque tube, thus again reducing the time necessary for installation.

The rail 102 includes a number of openings 114 therethrough. The openings 114 are used to secure wire hangers so that electrical cables connecting the solar modules 16 and other equipment requiring or producing electrical energy can be conveniently passed along the length of the solar tracker 10.

Figure 3:
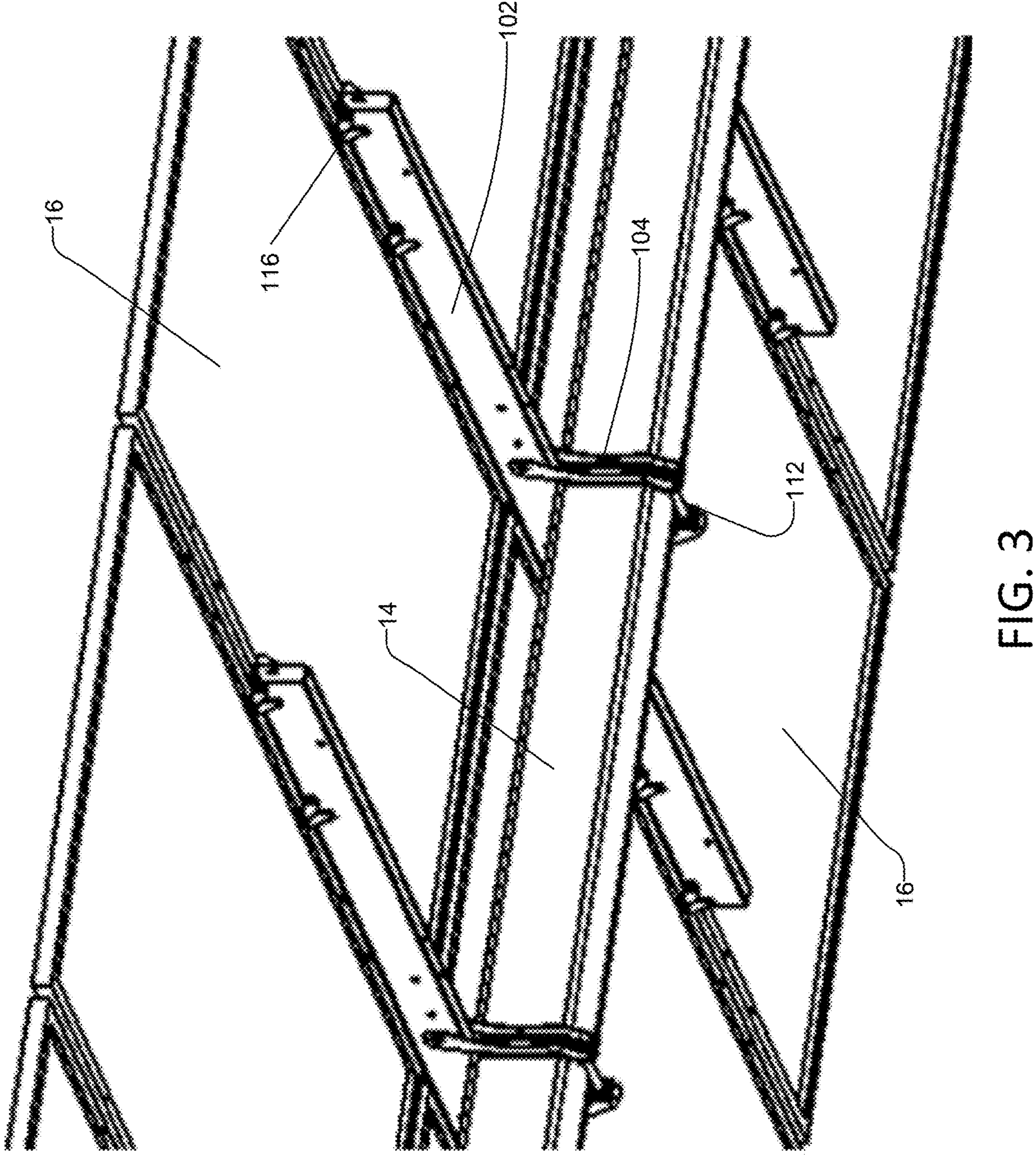
FIG. 3 is a lower perspective view of the solar module mounting bracket of FIG. 2 secured to a solar tracker and supporting solar modules in a two-in-portrait configuration.

FIG. 3 depicts a perspective view of a solar tracker 10. In FIG. 3 the mounting bracket 100, from FIG. 2, has been placed on the torque tube 14, in this instance a square or rectangular torque tube 14, and the arms 104 rotated to the second position perpendicular to the longitudinal axis of the rail 102 so that the arms 104 capture the torque tube 14 in the opening 107. Though not shown in FIG. 3, a fastener 112 should be placed in the holes 108, and the fastener 112 tightened to prevent the rotation of the torque tube 14 in the opening 107 between the two arms 104. FIG. 3 depicts a square or rectangular torque tube 14, however, the instant disclosure is not so limited and may be implemented on other torque tube designs including D-shaped and other torque tube designs.

Figure 4A:
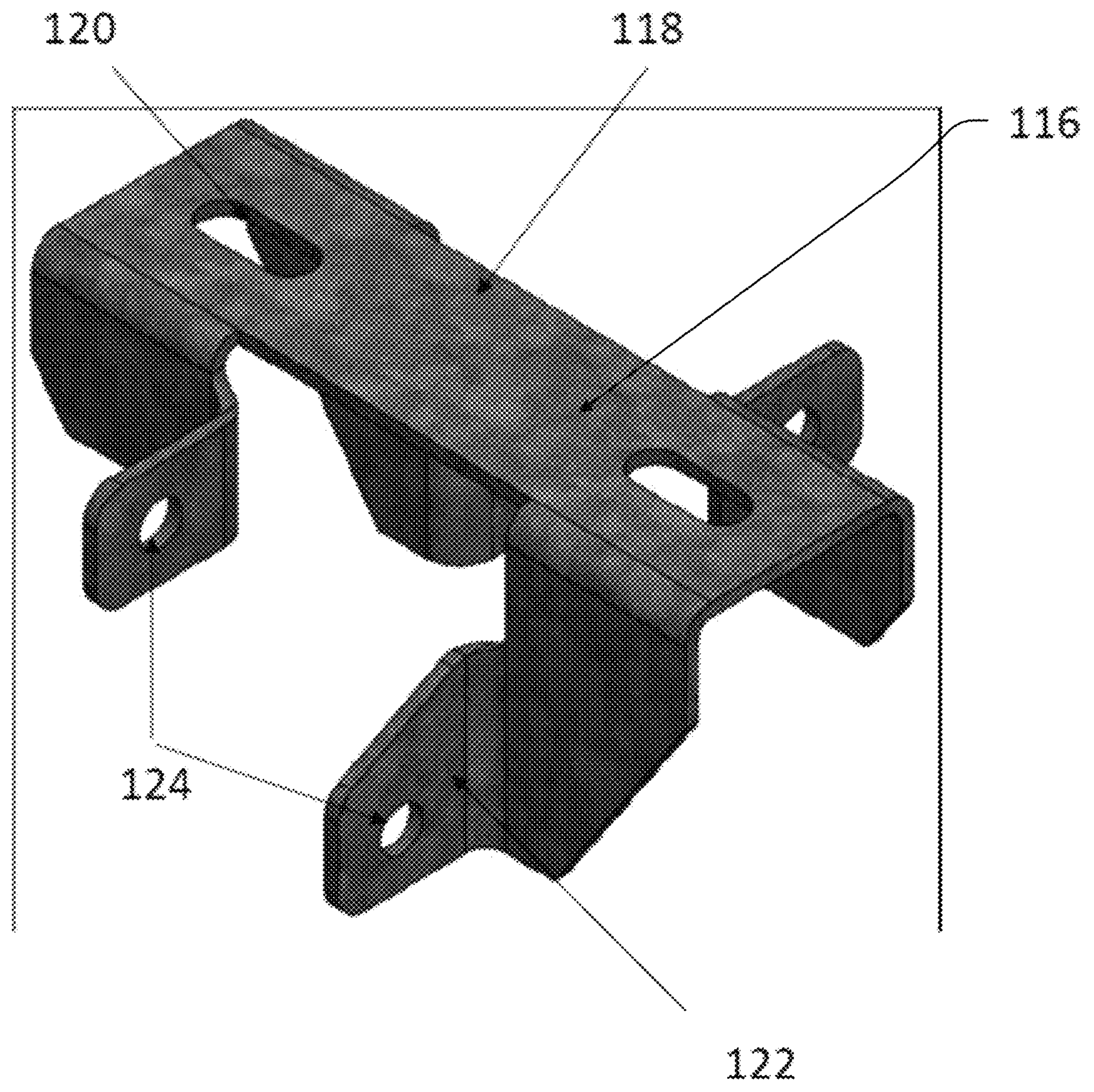
FIG. 4A is a perspective view of a clip for securing the solar modules to the rail in accordance with the disclosure.
Figure 4B:
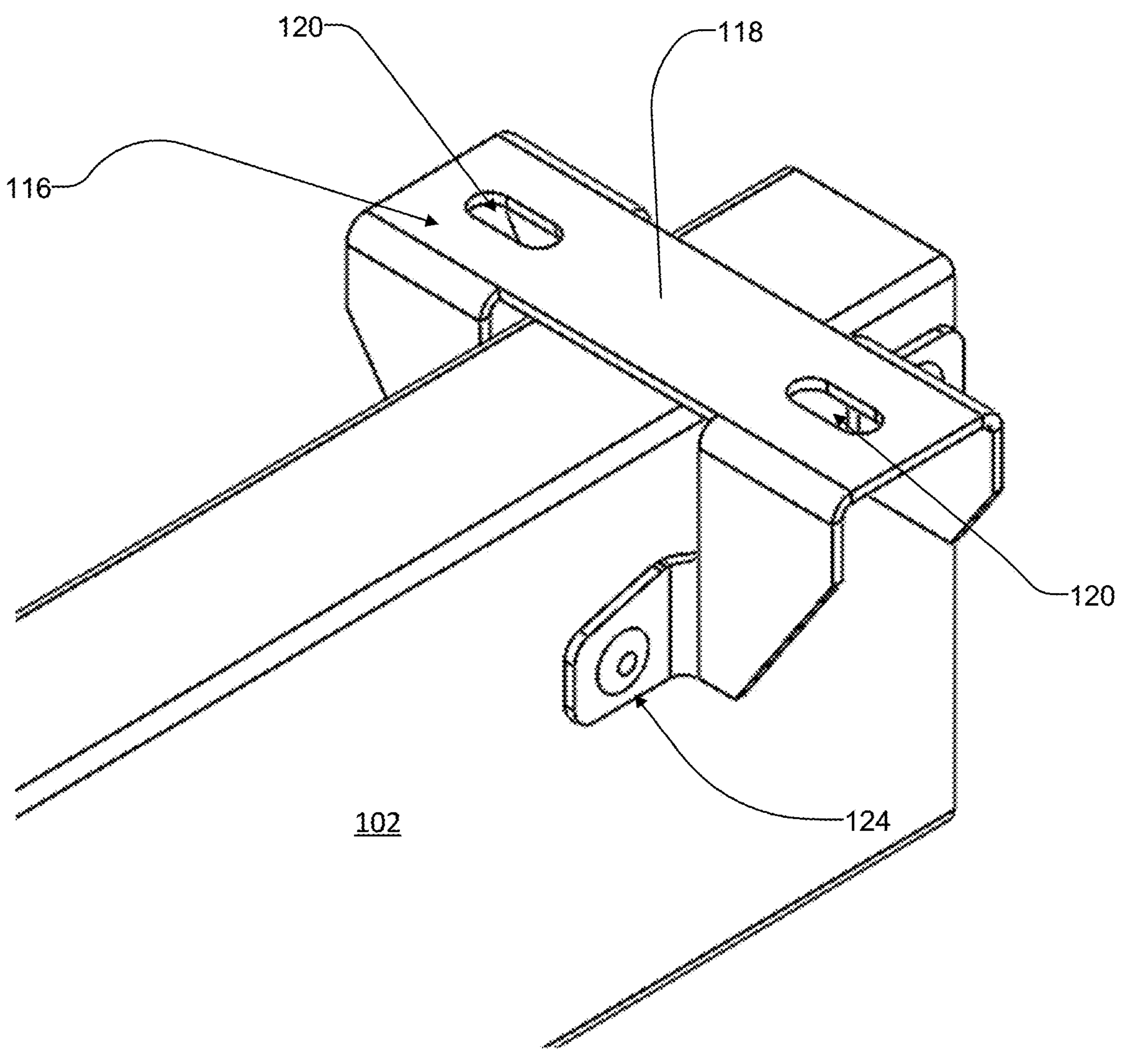
FIG. 4B is a perspective view of the clip as in FIG. 4A coupled to the rail, in accordance with the disclosure.

As can be seen in FIG. 3, clips 116 are employed to secure the solar modules 16 to the rail 102 and therewith the solar tracker 10. The clips 116 are shown in more detail with reference to FIGS. 4A and 4B. For example, FIG. 4A depicts a perspective view of a singular clip 116, and 4B depicts the clip 116 coupled to the rail 102. Each clip 116 includes a top surface 118 with at least one opening 120 formed therein. The clip 116 also includes at least one side surface 122. The side surfaces 122 are substantially perpendicular to the top surface 118 and when two side surfaces 122 are employed they are spaced from one another such that they receive the rail 102 therebetween. Holes 124 are formed in the side surface 122 and are aligned with corresponding holes (not shown) formed in the rail 102. A fastener such as a bolt, rivet, swage fitting, bobtail or others passes through the holes 124 and the corresponding openings in the rail 102 to secure the clip 116 to the rail 102. The holes 124 are generally round, and their geometry generally fixed relative to the geometry of the holes formed in the rail 102.

The openings 120 in the top surface 118, in contrast to the holes 124 formed in the side surfaces may have an oblong shape, though other shapes may be employed. The top surface 118 is designed to have a solar panel placed thereon. A fastener (not shown) such as a bolt, rivet, swage fitting, bobtail or others is inserted through a corresponding opening formed in a bezel of the solar module 16 and through the opening 120. The oblong shape of the opening 120 allows for positioning of the solar module on the clip 116 to be slightly altered along the longitudinal axis of the solar tracker. This can assist in accommodating slight variations is sizes of the solar module 16 as well as construction tolerances of the solar tracker.

As depicted in FIG. 3, two clips 116 are employed on the rail 102 on each side of the torque tube 14. The two clips 116 are secured to each solar module 16 on opposite sides of a midline of the long side of the solar module 16. As can be seen the rail 102, does not extend the full length of the solar module 112 but rather ends at a point past the midline of the solar module 16, but before the end of the solar module 16. As will be appreciated, the shorter length of the rail 102 reduces the amount of steel or other material needed to support the solar module.

Figure 5:
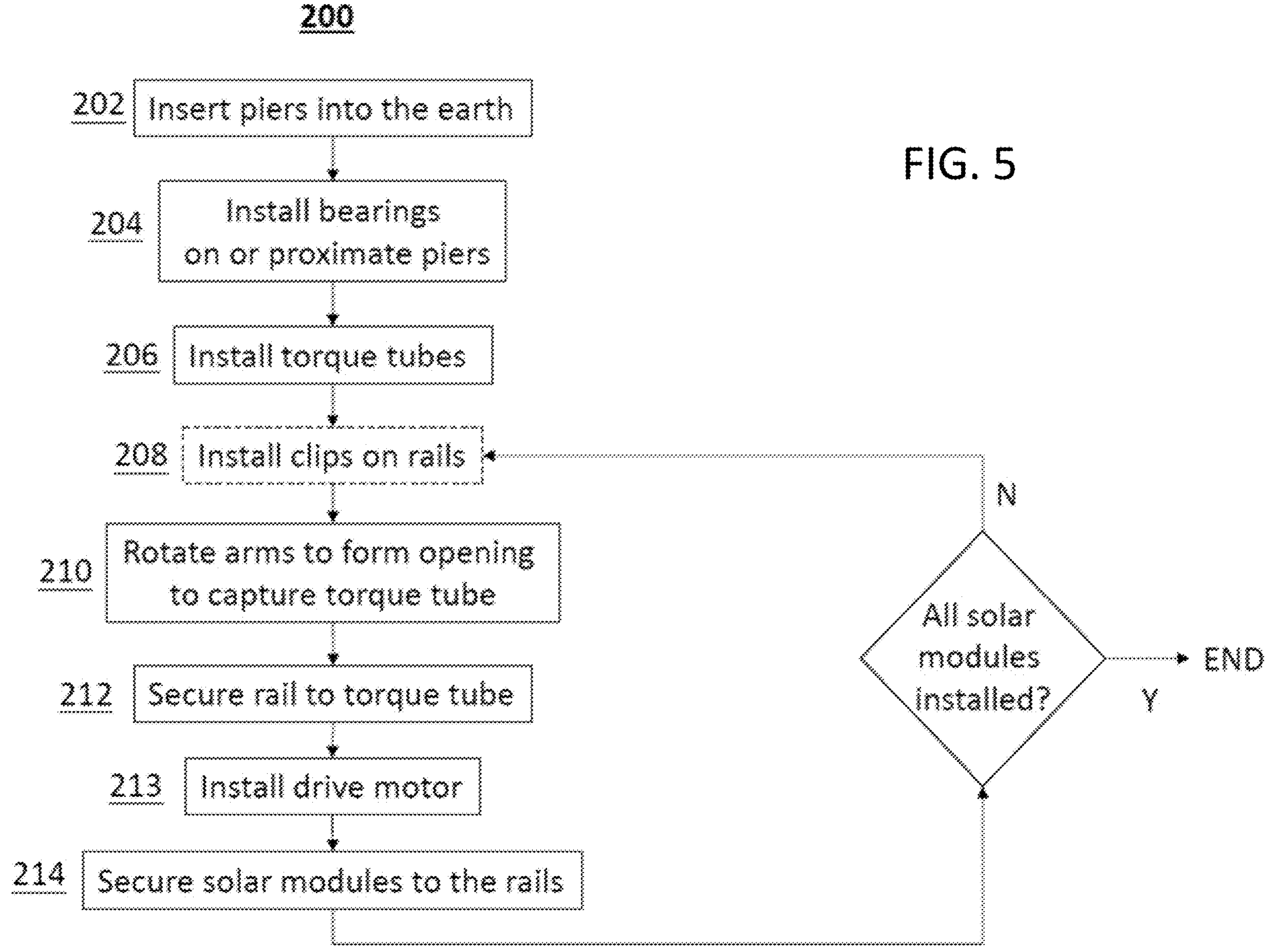
FIG. 5 is a flow chart detailing a method of installing a solar tracker employing the solar module mounting bracket of FIG. 2.

Another aspect of the disclosure relates to a method 200 of installation of the mounting bracket 100 and the solar modules, as shown in FIG. 5. As an initial matter, the piers 12 are inserted into the earth at step 202. Following insertion of the piers 12, bearings are installed on or near the piers 12 at step 204. At step 206, the torque tubes 14 are installed on the piers 12 connected by the bearings. Once the torque tubes 14 are connected along the length of the solar tracker 10, the mounting brackets 100 can be installed. Installation of the mounting brackets 100 can be undertaken by installing the clips 116 onto the rails 102 for each mounting bracket 100 to be installed on the solar tracker 10 at step 208. However, step 208 is an optional step that may be undertaken at the factory or an assembly site prior to the mounting brackets 100 being shipped the location where the solar tracker 10 is to be installed. At step 210, the arms 104 of the mounting bracket 100 may be rotated to the second position and the mounting bracket 100 secured to the torque tube 14 with a fastener at step 212. With the mounting bracket 100 secured to the torque tube 14 and the clips 116 secured to the rail 102, the drive motor may be secured to one of the piers. Alternatively, the drive motor and a drive shaft may be secured to the mounting bracket s100 via drive shaft hangers (not shown). The solar modules 16 may be secured to the rail clip via a fastener at step 214. Steps 208-214 may occur in any order, and particularly step 208 may even be performed at a manufacturing facility, with 100 being delivered to the solar power plant site with the clips 116 already installed. As will be appreciated, each solar module 16 will be supported on two rails 102 or two mounting brackets 100 on either side of the solar module 16. Each solar module 16 will be connected to each mounting bracket 100 via four clips 116 through the use of fasteners at step 214. Steps 208-214 are repeated until all solar modules 16 are secured to the rails 102 and the torque tube 14, a determination made at step 216, if all are installed then the method 200 ends. These connections of the solar module 16 to the rail 102 and therewith the torque tube ensure that the solar tracker 10 is sufficiently rigid for the prevailing conditions at the solar power plant and that the solar modules 16 and therewith the rails 102 will not bend, flex, or twist as a result of wind and other forces acting on the solar tracker 10.

The prevention of bending, flexing, and twisting is particularly important as the mounting bracket 100 is particularly designed for a two-in-portrait "2nP" arrangement. A typical solar module can have a long side of up-to about 77 inches (1.95 m) and a width of between 39 (0.99 m) and 42 inches (1.06 m), however, the mounting bracket 100 may be employed with modules having a long side dimension of 2.283 m and a width dimension of 1.156 m without departing from the scope of the disclosure. Thus, a 2nP solar tracker as depicted in FIG. 3 will result in a solar tracker with a total width dimension (perpendicular to the longitudinal axis of the torque tube 14) of approximately 15 feet (4.566 m). The 2nP design has the benefit of increasing energy yields for a given length of solar tracker 10 as a greater number of solar modules 16 may be attached over the given length. However, because of this increased width of the solar tracker to over 13 feet, the forces required to move the solar tracker and those generated by wind (and snow) loading opposing the movement of the solar tracker are greatly increased. Thus there is a need for a design with increased resistance to bending and twisting, but simultaneously reducing the weight of the solar module mounting bracket and therewith the weight of the solar tracker. The use of a box section rail 102 having a length sufficient to support 2 solar modules 16 in parallel, but not extending the full length of both solar modules 16 provides distinct advantages over prior known mounting brackets. Further the use of the arms 104 and the clips 116 as described herein above greatly increase the speed and efficiency of the mounting process as compared to prior systems.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

The invention claimed is:

1. A solar module mounting bracket, comprising:

a rail, having a box cross-sectional configuration that comprises four walls that define a closed interior channel at the rail, and configured to support at least one solar module thereon;

a pair of arms each having a first end portion movably coupled to the rail, wherein the pair of arms are movable relative to the rail between a first substantially parallel configuration, and a second substantially perpendicular configuration to define an opening configured to receive a torque tube, wherein the arms each have a hole formed in a second end portion opposite the first end portion and configured to receive a fastener to secure the rail to the torque tube.

2. The solar module mounting bracket of claim 1, wherein the opening defined by the arms is a square, rectangular, or D-shaped opening.

3. The solar module mounting bracket of claim 1, wherein the four walls have a wall thickness ranging from 1.2 to 2.5 mm.

4. The solar module mounting bracket of claim 1, wherein the rail includes a plurality of holes formed therein configured to receive electrical cables.

5. The solar module mounting bracket of claim 1, further comprising at least one clip configured to secure the at least one solar module to the rail.

6. The solar module mounting bracket of claim 5, wherein clip further comprises a top surface with at least one opening formed therein, the opening configured to receive a fastener to secure the at least one solar module to the clip.

7. The solar module mounting bracket of claim 5, wherein the clip further includes at least one side surface, the side surface having at least one hole formed therein, the hole configured to receive a fastener to secure the clip to the rail.

8. The solar module mounting bracket of claim 5, further comprising two pairs of clips secured to the rail, wherein each pair of clips is secured to the rail with a plurality of fasteners, and each pair of clips is arranged on the rail to receive a solar module in a portrait configuration, wherein in a portrait configuration a long side of the solar module is parallel to the rail.

9. The solar module mounting bracket of claim 8, wherein the two pairs of clips are secured to the rail to receive two solar modules in portrait.

10. The solar module mounting bracket of claim 9, wherein each clip includes at two openings formed in a top surface, each opening having an oblong shape, wherein the two openings are configured to receive two solar modules parallel to one another.

11. A solar tracker comprising:

a plurality of piers;

a bearing supported by one of the plurality of piers;

a drive device supported by one of the plurality of piers;

a torque tube operably connected to the drive device and supported by the plurality of piers; and a solar module mounting bracket, wherein the solar module mounting bracket includes a rail, having a box cross-sectional configuration that comprises four walls that define a closed interior channel at the rail, and a pair of arms each having a first end portion movably coupled to the rail, wherein the pair of arms are movable relative to the rail between a first substantially parallel configuration and a second substantially perpendicular configuration to define an opening configured to receive the torque tube, wherein the arms each have a hole formed in a second end portion opposite the first end portion and configured to receive a fastener to secure the rail to the torque tube.

12. The solar tracker of claim 11, wherein the torque tube is a square, rectangular, or D-shaped torque tube and the opening defined by the arms is a square, rectangular, or D-shaped opening.

13. The solar tracker of claim 11, wherein the four walls have a wall thickness ranging from 1.2 to 2.5 mm.

14. The solar tracker of claim 11, wherein the rail includes a plurality of holes formed therein configured to receive electrical cables.

15. The solar tracker of claim 11, wherein the solar module mounting includes at least one clip configured to secure at least one solar module to the rail.

16. The solar tracker of claim 15, wherein clip further comprises a top surface with at least one opening formed therein, the opening configured to receive a fastener to secure the at least one solar module to the clip.

17. The solar tracker of claim 15, wherein the clip further includes at least one side surface, the side surface having at least one hole formed therein, the hole configured to receive a fastener to secure the clip to the rail.

18. The solar tracker of claim 15, further comprising two pairs of clips secured to the rail, wherein each pair of clips is secured to the rail with a plurality of fasteners, and each pair of clips is arranged on the rail to receive a solar module in a portrait configuration, wherein in a portrait configuration a long side of the solar module is perpendicular to a longitudinal axis of the torque tube.

19. The solar tracker of claim 18, wherein the two pairs of clips are secured to the rail to receive two solar modules in portrait.

20. The solar tracker of claim 19, wherein each clip includes at two openings formed in a top surface, each opening having an oblong shape, wherein the two openings are configured to receive two solar modules parallel to one another.

* * * * *